(12) United States Patent
Young et al.

(10) Patent No.: US 12,075,225 B2
(45) Date of Patent: *Aug. 27, 2024

(54) SYSTEMS AND METHODS FOR BROADCASTING AUDIO

(71) Applicant: Bose Corporation, Framingham, MA (US)

(72) Inventors: Douglas Warren Young, Arlington, MA (US); Kathleen S. Krisch, Sudbury, MA (US); Don L. Drinkwater, Carlisle, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,321

(22) Filed: Mar. 30, 2022

(65) Prior Publication Data

US 2022/0225029 A1 Jul. 14, 2022

Related U.S. Application Data

(63) Continuation of application No. 16/832,815, filed on Mar. 27, 2020, now Pat. No. 11,304,006.

(51) Int. Cl.
| | | |
|---|---|---|
| *H04R 5/04* | (2006.01) | |
| *H04H 20/61* | (2008.01) | |
| *H04H 40/18* | (2008.01) | |
| *H04R 1/10* | (2006.01) | |
| *H04W 4/80* | (2018.01) | |
| *H04W 40/12* | (2009.01) | |
| *H04W 74/00* | (2009.01) | |

(52) U.S. Cl.
CPC ............... *H04R 5/04* (2013.01); *H04H 20/61* (2013.01); *H04H 40/18* (2013.01); *H04R 1/1041* (2013.01); *H04W 4/80* (2018.02); *H04W 40/12* (2013.01); *H04W 74/008* (2013.01); *H04M 2250/02* (2013.01); *H04R 2420/01* (2013.01); *H04R 2420/05* (2013.01); *H04R 2420/07* (2013.01)

(58) Field of Classification Search
CPC ........ G06F 3/165; H04H 20/61; H04H 40/18; H04M 2250/02; H04R 1/1041; H04R 2420/01; H04R 2420/05; H04R 2420/07; H04R 2460/07; H04R 5/033; H04R 5/04; H04S 3/008; H04W 4/80; H04W 40/12; H04W 74/008
USPC ...... 455/41.1, 41.2, 425, 435; 370/312, 338; 381/315
See application file for complete search history.

(56) References Cited

U.S. PATENT DOCUMENTS 11,304,006 B2 * 4/2022 Young ................... H04H 20/61
2018/0199138 A1 * 7/2018 Dusan ................. H04R 5/0335
(Continued)

*Primary Examiner* — Tan H Trinh
(74) *Attorney, Agent, or Firm* — Bond, Schoeneck & King, PLLC

(57) ABSTRACT

An audio system, device, and method for broadcasting, discovering, and receiving wireless audio data connections. The exemplary systems and methods described herein utilize an Isochronous Broadcast Stream topology to unilaterally broadcast a plurality of wireless audio data streams. The audio devices described are configured to discover and receive the plurality of wireless audio data streams and allow the user to organize these streams into a determined order and cycle through each stream based on user input.

20 Claims, 6 Drawing Sheets

(56) References Cited

U.S. PATENT DOCUMENTS

| | | | |
|---|---|---|---|
| 2020/0053460 A1* | 2/2020 | Pedersen | H04W 4/80 |
| 2020/0104194 A1* | 4/2020 | Chalmers | H04L 51/224 |
| 2021/0135704 A1* | 5/2021 | El-Hoiydi | H04R 3/08 |
| 2021/0168498 A1* | 6/2021 | Zhang | H04R 1/026 |
| 2022/0248333 A1* | 8/2022 | Soulier | H04W 52/0254 |
| 2022/0272644 A1* | 8/2022 | Lee | H04W 56/001 |
| 2023/0103916 A1* | 4/2023 | Lee | G10L 19/24 455/41.2 |

* cited by examiner

SYSTEMS AND METHODS FOR BROADCASTING AUDIO

PRIORITY CLAIM

This application is a continuation of U.S. patent application Ser. No. 16/832,815, filed Mar. 27, 2020, where the entire contents of the application are hereby incorporated by reference.

BACKGROUND

Aspects and implementations of the present disclosure are generally directed to systems and methods for broadcasting and receiving wireless audio data streams, for example, broadcasting and receiving wireless audio data streams between wireless devices.

Currently wireless audio data connections often rely on handshakes and paired connections between two wireless audio devices. Wearable wireless audio devices, e.g., headphones, utilize these paired connections to stream wireless audio data. The process of establishing wireless audio data connections is time consuming and is not desirable in situations where multiple source devices are available for connection.

SUMMARY OF THE DISCLOSURE

The present disclosure relates to systems, devices, and methods for broadcasting, discovering, and receiving wireless audio data connections. The exemplary systems and methods described below utilize an Isochronous Broadcast Stream topology to unilaterally broadcast a plurality of wireless audio data streams. The audio devices described herein are configured to discover and receive the plurality of wireless audio data streams and allow the user to organize these streams into a determined order and cycle through each stream based on user input.

The present disclosure utilizes wireless audio transmission schemes, specifically to wireless topologies for broadcasting audio streams between devices. For example, Core Specification 5.2 released by the Bluetooth Special Interest Group (SIG) on Jan. 6, 2020, defines new features related to Bluetooth Low Energy (BLE) topologies. One feature described in the 5.2 Core Specification is Broadcast Isochronous Streams which utilize connectionless isochronous communications. As will be described below in detail, the present application is related to systems, devices, and methods to provide a user of a compatible device, e.g., and audio device 102, with methods of interacting with isochronous communications of source devices, e.g., source devices 104. In one example, the systems, devices, and methods discussed herein utilize Bluetooth Low-Energy audio topologies enabled by the 5.2 Core Specification (referred to herein as "LE Audio"). LE Audio typically utilizes lower energy consumption than traditional or classic Bluetooth connections. Additionally, unlike Bluetooth classic, LE Audio may utilize Low Complexity Communication Codec (referred to as "LC3") which compresses audio data for transmission through the air. Unlike Bluetooth Classic's Low-Complexity Subband codec (SBC codec), LC3 scales down to very low bit rates, e.g., 160 kbps, which helps ensure that audio data successfully sends over the bandwidth of LE Audio connections.

In one example, an audio device is provided, the audio device including: an antenna arranged to discover a plurality of wireless audio data streams, the plurality of wireless audio data streams using a digital packet-based wireless data protocol; circuitry configured to switch the audio device to a broadcast discovery mode upon receiving an indication, and in response, the circuitry is further configured to generate a first audio signal corresponding to a first wireless audio data stream of the plurality of wireless audio data streams; an acoustic transducer electrically connected to the circuitry, the acoustic transducer configured to render a first sound using the first audio signal, and a sensor electrically connected to the circuitry, the sensor configured to receive user input wherein upon receiving the user input via the sensor, the circuitry is configured to generate a second audio signal corresponding to a second wireless audio data stream of the plurality of wireless audio data streams and the acoustic transducer is configured to render a second sound using the second audio signal.

In an aspect, the digital packet-based wireless data protocol is a Bluetooth Low-Energy (BLE) protocol.

In an aspect, the BLE protocol utilizes a Broadcast Isochronous Stream.

In an aspect, the indication is a confirmation that the audio device is in a location or an initial user input received via the sensor.

In an aspect, the sensor includes at least one of: a button, a touch-capacitive sensor, a proximity sensor, a near-field communication (NFC) unit, a gyroscope, an accelerometer, a camera, or a microphone.

In an aspect, the first wireless audio data stream is generated by a first source device and the second wireless audio data stream is generated by a second source device different than the first source device.

In an aspect, each receipt of the user input cycles through each of the wireless audio data streams of the plurality of wireless audio data streams in a determined order.

In an aspect, the determined order is based at least in part on a Received Signal Strength Indicator (RSSI) associated with each wireless audio data stream of the plurality of wireless audio data streams.

In an aspect, the determined order is selected based at least in part on a user's prior behavior.

In an aspect, each receipt of the user input that cycles through each of the wireless audio data streams of the plurality of wireless audio data streams corresponds with an audio feedback to indicate which wireless audio data stream is active.

In one example, a method of selecting an audio stream is provided, the method including: discovering, via an antenna of an audio device, a plurality of wireless audio data streams using a digital packet-based wireless data protocol; receiving an indication via circuitry of the audio device; switching, via the circuitry, to a broadcast discovery mode upon receiving the indication; receiving, via the circuitry, the plurality of wireless audio data streams from the antenna; generating, via the circuitry, a first audio signal corresponding to a first wireless audio data stream of the plurality of wireless audio data streams; generating, via an acoustic transducer electrically connected to the circuitry, a first sound using the first audio signal; receiving user input from a sensor connected to the circuitry; generating a second audio signal corresponding to a second wireless audio data stream of the plurality of wireless audio data streams, via the circuitry, upon receiving the user input from the sensor; and, generating, via the acoustic transducer, a second sound using the second audio signal.

In an aspect, the digital packet-based wireless data protocol is a Bluetooth Low-Energy (BLE) protocol.

In an aspect, the BLE protocol utilizes broadcast isochronous data stream.

In an aspect, the indication is: a confirmation that the audio device is in a location or an initial user input received via the sensor.

In an aspect, the sensor includes at least one of: a button, a touch-capacitive sensor, a proximity sensor, a near-field communication (NFC) unit, a gyroscope, an accelerometer, a camera, or a microphone.

In an aspect, the first wireless audio data stream is generated by a first source device and the second wireless audio data stream is generated by a second source device different than the first source device.

In an aspect, each receipt of the user input cycles through each of the wireless audio data streams of the plurality of wireless audio data streams in a determined order.

In an aspect, the determined order is based at least in part on a Received Signal Strength Indicator (RSSI) associated with each wireless audio data stream of the plurality of wireless audio data streams.

In an aspect, the determined order is selected based at least in part on a user's prior behavioral data.

In an aspect, each receipt of the user input that cycles through each of the wireless audio data streams of the plurality of wireless audio data streams corresponds with an audio feedback to indicate which wireless audio data stream is active.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to systems, devices, and methods for broadcasting, discovering, and receiving wireless audio data connections. The exemplary systems and methods described below utilize an Isochronous Broadcast Stream topology to unilaterally broadcast a plurality of wireless audio data streams. The audio devices described herein are configured to discover and receive the plurality of wireless audio data streams and allow the user to organize these streams into a determined order and cycle through each stream based on user input.

Figure 1:
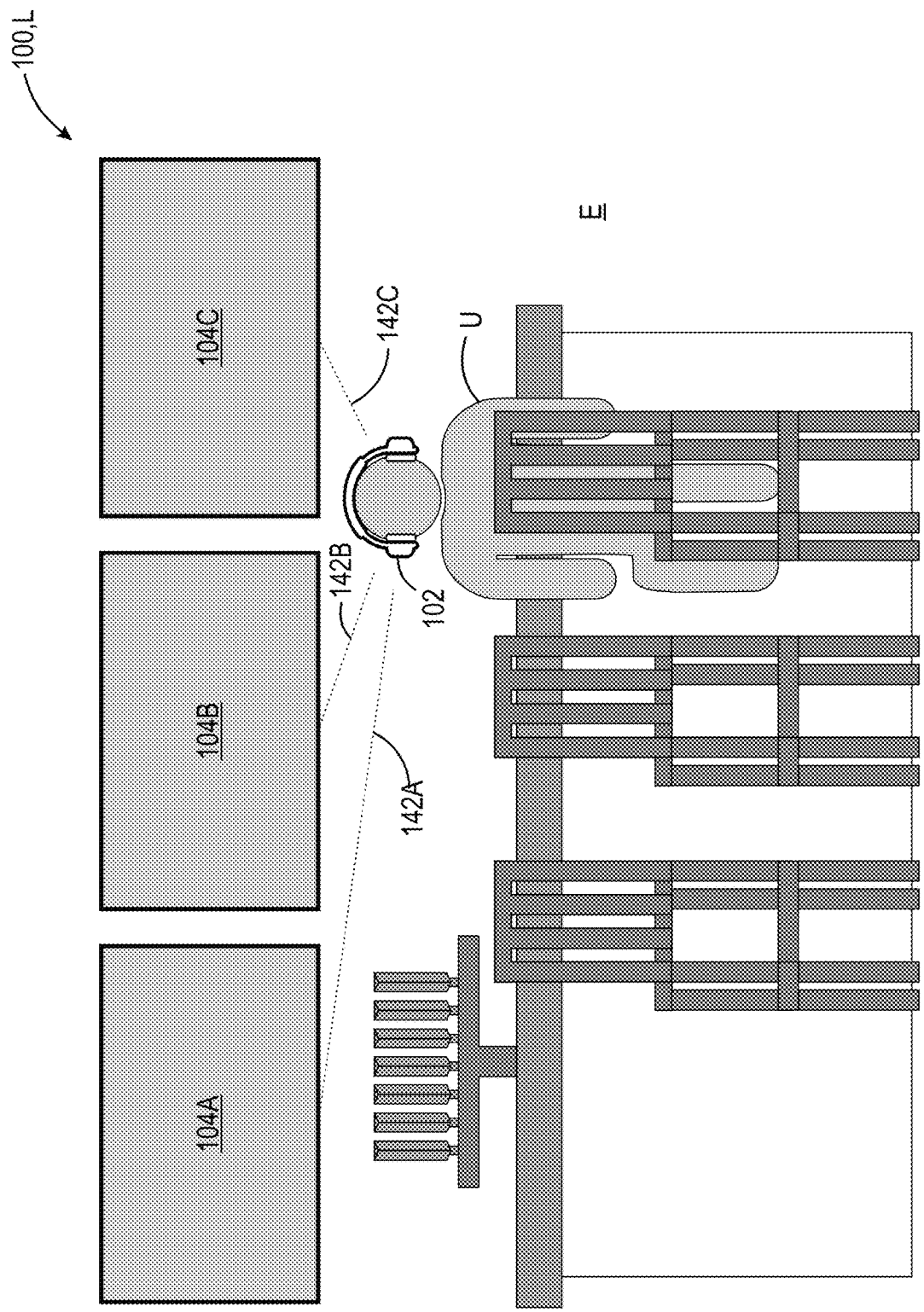
FIG. 1 is a schematic view of an audio system according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an over-the-ear headset, in other examples the wearable audio device may be an in-ear, on-ear, around-ear, or near-ear headset, truly wireless ear buds (e.g., two wireless earbuds without a physical connection between each bud which may be synchronized to the same Broadcast Isochronous data, discussed below), or may be an audio eyeglasses form factor headset. In some examples, the wearable audio device may be an open-ear device that includes an acoustic driver to radiate acoustic energy towards the ear while leaving the ear open to its environment and surroundings.

The following description should be read in view of FIGS. 1-4. FIG. 1 is a schematic view of audio system 100 employed in an environment E according to the present disclosure. Audio system 100 includes audio device 102 and a plurality of source devices 104A-104C (collectively referred to as "source devices 104" or "plurality of source devices 104"). Audio device 102 is intended to be a wearable audio device, e.g., a pair of headphones, earphones, earpieces, headset, earbuds, or sport headphones. It should also be appreciated that audio device 102 can be a wireless and/or portable speaker or speaker system. Each source device of plurality of source devices 104 is intended to be a device capable of sending and/or receiving wireless audio broadcast streams within environment E. In one example, audio device 102 is arranged to be secured proximate a user's ear, e.g., within 5 cm of a user ear. Environment E and/or location L (discussed below) correspond to places or environments where there are multiple source devices 104, e.g., a sports bar (illustrated in FIG. 1), a restaurant, a gym, etc. In one example, each source device of plurality of source devices 104 is a television capable of broadcasting an audio stream associated with a show or program being displayed on the screen of the television via a digital packet-based wireless data protocol. In another example, source devices 104 are selected from: a wireless speaker, a portable speaker, a smart phone, tablet, personal computer, a wireless access point configured to connect to a remote server via the Internet, or any device capable of sending and/or receiving wireless audio broadcast streams within environment E. As will be discussed below with reference to FIGS. 1-4, within environment E, a user U can utilize or interact with audio device 102 to switch audio device 102 from a default mode 126 (discussed below) to a broadcast discovery mode 128 (discussed below). While in broadcast discovery mode 128, the user U may provide a user input 124 to cycle through a plurality of wireless audio data streams 142A-142C (discussed below) corresponding to at least one of the respective source devices 104.

Figure 2:
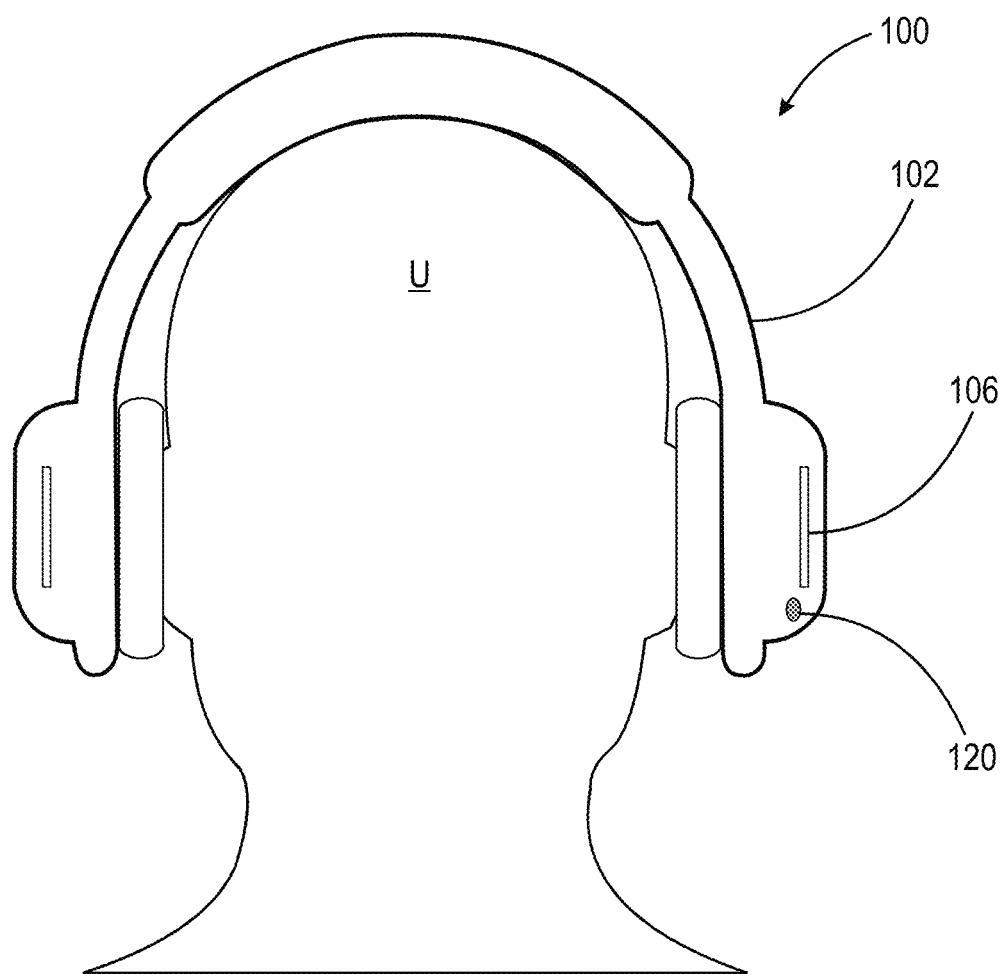
FIG. 2 is a schematic view of an audio device according to the present disclosure.
Figure 3:
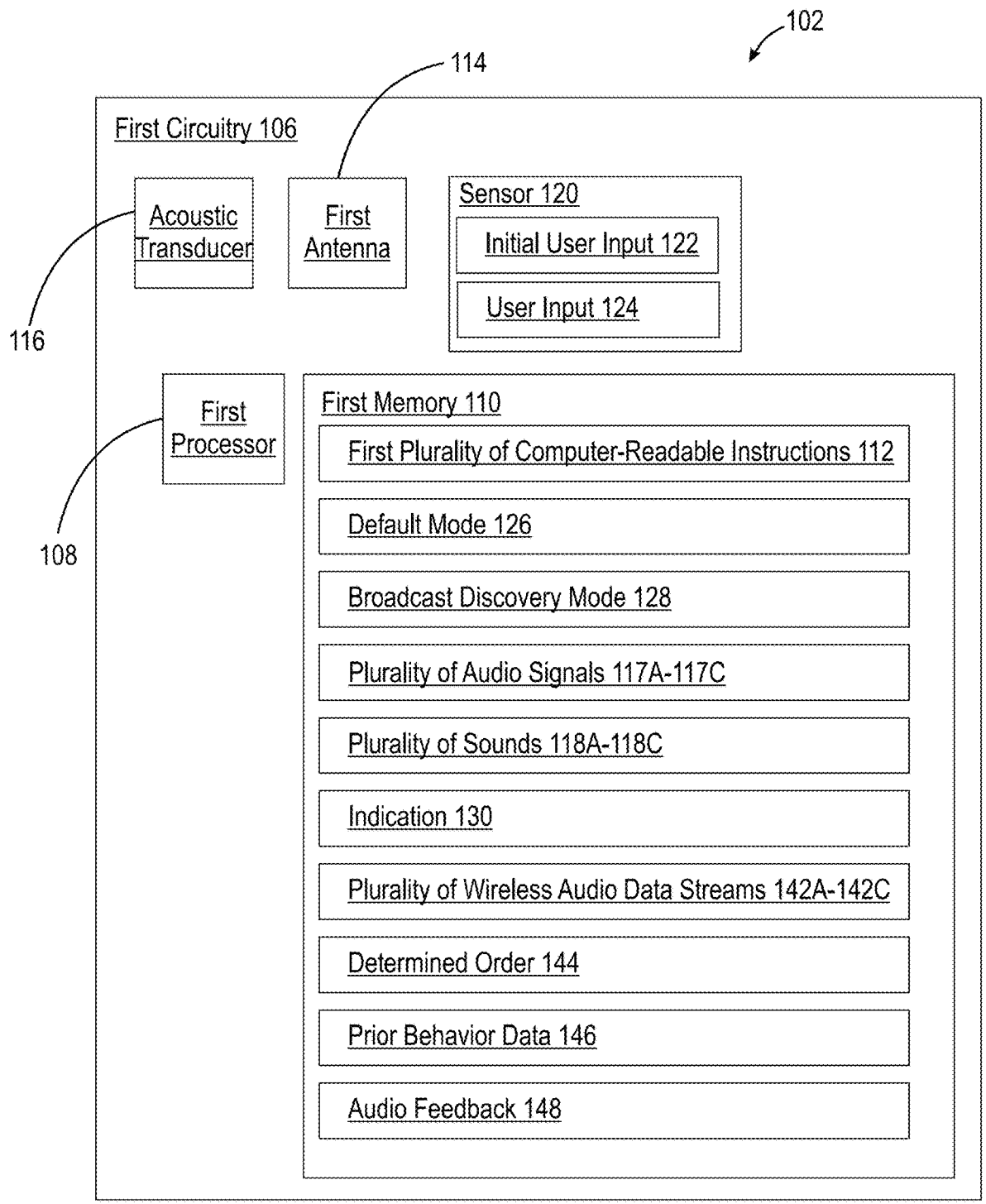
FIG. 3 is a schematic view of circuitry of an audio device according to the present disclosure.

As illustrated in FIGS. 2 and 3, audio device 102 comprises first circuitry 106. First circuitry 106 includes first processor 108 and first memory 110 configured to execute and store, respectively, a first plurality of non-transitory computer-readable instructions 112, to perform the various functions of audio device 102 and first circuitry 106 as will be described herein. First circuitry 106 also includes first antenna 114 and an acoustic transducer 116, where first antenna 114 and acoustic transducer 116 are electrically connected to first processor 108 and first memory 110. First antenna 114 is configured to send and/or receive wireless data corresponding to wireless data sent and/or received from each source device of plurality of source devices 104, and acoustic transducer 116 is configured to generate sound, i.e., audible acoustic energy, e.g., at least one sound of a plurality of sounds 118A-118C (discussed below) corresponding to respective wireless audio data streams of plurality of wireless audio data streams 142A-142C (discussed below).

Audio device 102 further comprises a sensor 120 electrically connected to first circuitry 106. Sensor 120 is selected from at least one of: a button arranged on the surface of audio device 102, a touch-capacitive sensor arranged on the surface of audio device 102, a touch screen sensor arranged on the surface of audio device 102, an accelerometer, a gyroscope, a magnetometer, a proximity sensor, a Global Positioning Service (GPS) sensor, a near-field communication (NFC) unit, a camera, or a microphone. The user U, while in environment E, can engage or otherwise interact with audio device 102 such that an action by the user U results in an input generated by the user via the sensor 120, e.g., initial user input 122 or user input 124 (discussed below). It should be appreciated that although described as a single sensor, i.e., sensor 120, initial user input 122 and/or user input 124 may utilize data generated by one or more sensors, where each additional sensor is selected from the list of sensors described above. As discussed below, initial user input 122 is intended to be a user input which utilizes at least one sensor, e.g., sensor 120, to generate an indication 130 that the user U desires to switch audio device 102 from a default mode 126 to a broadcast discovery mode 128. In one example, initial user input 122 is a voice input obtained by sensor 120 where sensor 120 is a microphone. In another example, initial user input 122 is obtained by sensor 120 where sensor 120 is a button or touch-capacitive sensor. In a further example, initial user input 122 is obtained by sensor 120 where sensor 120 is a gyroscope or accelerometer arranged to generate a signal in response to a gesture or motion of user U. In addition, indication 130 can be generated without user input, e.g., can be generated based on sensor data, location, time of day, or other data source generated with or without user interaction with audio device 102.

Audio system 100 further includes a plurality of source devices 104. In one example, as illustrated in FIG. 1, source devices 104 are televisions capable of sending and receiving wireless audio data via a digital packet-based wireless data protocol. As used herein, the term "digital packet-based wireless data protocol" is intended to mean any wireless connection-based protocol which divides the data structure of the data stream to be sent from a source device to a receiving device into discrete sections of data or packets, and sequentially sends each packet from the source device to the receiving device. In one example, the digital packet-based wireless data protocol is a Bluetooth data protocol. In another example, the digital packet-based wireless data protocol is Bluetooth Low-Energy (BLE) protocol or LE Audio. In one example, the digital packet-based wireless data protocol is LE Audio which utilizes the LC3 audio codec discussed above. In a further example, the digital packet-based wireless data protocol utilizes a frequency between 2.4 GHz and 6.0 GHz. In some aspects, "digital packet-based wireless data protocol," as used herein, excludes long-range packet-based protocols for digital radio broadcasts, e.g., packet radio communications, digital radio communications, etc. In such aspects, this distinction can be identified based on the wireless protocol being used (e.g., Bluetooth for the techniques described herein versus Internet radio for digital radio broadcasts), based on the transmission frequency range being used (e.g., frequencies in the GHz range for the techniques described herein versus frequencies in the MHz range for digital FM radio broadcasts), and/or other factors as can be understood based on this disclosure.

Figure 4:
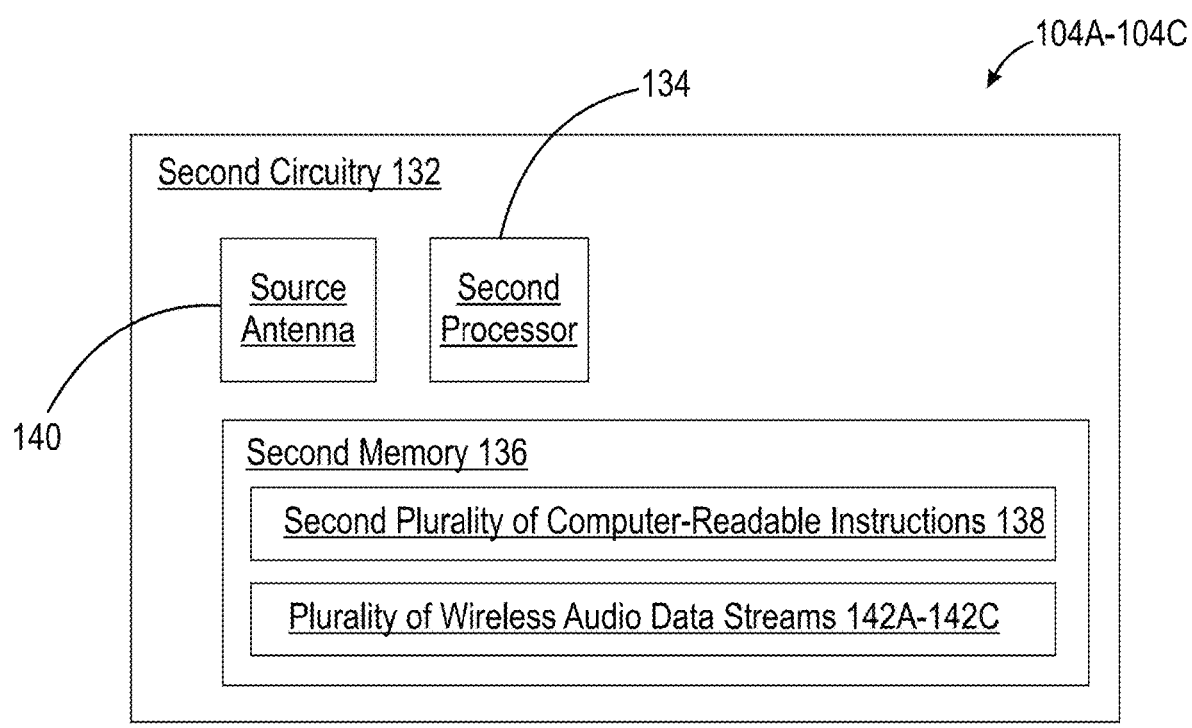
FIG. 4 is a schematic view of circuitry of a source device according to the present disclosure.

As illustrated in FIG. 4, each source device within plurality of source devices 104 includes second circuitry 132. It should be appreciated that although only one second circuitry 132 is illustrated and described herein, each source device of plurality of source devices 104 can include second circuitry 132. Second circuitry 132 includes a second processor 134 and second memory 136 configured to execute and store, respectively, a second plurality of non-transitory computer-readable instructions 138 to perform the various functions of the source devices 104 or second circuitry 132 as described herein. Additionally, each source device of plurality of source devices 104 includes at least one source antenna 140. In one example, as illustrated in FIG. 1, there are three source devices 104A-104C. In this example, each source device, having second circuitry 132, includes at least one source antenna 140, respectively. Each source antenna 140 is configured to send and/or receive wireless data corresponding to, e.g., a plurality of wireless audio data streams 142A-142C, respectively. In one example, the wireless data sent from each source device 104 to audio device 102 is utilized to generate an audio signal of a plurality of audio signals 117A-117C. Each audio signal is utilized by acoustic transducer 116 of audio device 102 to generate sound, i.e., audible acoustic energy, e.g., at least one sound of a plurality of sounds 118A-118C (discussed below) corresponding to respective wireless audio data streams of plurality of wireless audio data streams 142A-142C. In addition, each source device 104 may include additional circuitry or antennae configured to receive wired or wireless data from a remote source, e.g., a cable television service system, a satellite television source device, a remote server connected to second circuitry 132 via the Internet, or any other source of audio data and/or video data to be used by source devices 104. As discussed above, plurality of wireless audio data streams 142A-142C utilize a digital packet-based wireless data protocol, e.g., Bluetooth Low-Energy (BLE) protocols or LE Audio, to stream wireless audio data. It should be appreciated that the LE Audio may utilize the LC3 audio codec to compress the audio data of the wireless audio streams 142A-142C prior to transmission. In one example, the source antenna 140 of each source device 104A-104C, utilize a broadcast isochronous data stream structure to broadcast each respective wireless audio data stream, of plurality of wireless audio data streams 142A-142C.

As discussed above, when in environment E, audio device 102 can receive an indication 130, and, in response to the indication 130, can operate to switch audio device 102 from a default mode 126 to a broadcast discovery mode 128. The indication 130 can be a user provided input, e.g., initial user input 122 or user input 124, or can be generated in response to other sensor data that does not require affirmative user interaction. In one example, indication 130 can be an initial user input 122, where initial user input 122 corresponds with a signal produced by sensor 120, where sensor 120 is a button or touch-capacitive sensor. In another example, indication 130 can be an initial user input 122, where the initial user input 122 corresponds with a signal produced by sensor 120, where the sensor 120 is a gyroscope and/or accelerometer, and the signal is indicative of a motion or gesture of user U. In another example, indication 130 is a signal produced by sensor 120, where sensor 120 is a Global Positioning Service (GPS) sensor or proximity sensor, and the signal corresponds to the position of audio device 102 in a known environment E or known location L. In a further example, indication 130 may be a signal produced by sensor 120, where sensor 120 is a microphone and the signal corresponds to a voice input of the user U.

Upon receipt of the indication 130, audio device 102 is configured to switch audio device 102 from a default mode 126 to a broadcast discovery mode 128. Default mode 126 is intended to be an operational mode in which audio device 102 is configured to generate sound using stored audio data files or data received via traditional bi-directional paired wireless data connections with other devices within the environment E. Broadcast discovery mode 128, is intended to be an operational mode in which first antenna 114 of first circuitry 106 is configured to discover, listen for, or otherwise receive wireless data corresponding to plurality of wireless audio data streams 142A-142C from each of the source antenna 140 of plurality of source devices 104A-104C, respectively.

While in broadcast discovery mode 128, first circuitry 106 of audio device 102 is configured to discover, receive, and organize plurality of wireless audio data streams 142A-142C. The plurality of wireless audio data streams 142A-142C can be organized into a determined order 144. In one example, the determined order 144 is based on a Received Signal Strength Indicator (RSSI) value provided by each wireless audio data stream of plurality of wireless audio data streams 142A-142C. In this example, the RSSI value can be determined by data included in each wireless audio data stream. In another example, the determined order 144 is based on prior user behavior, i.e., prior behavior data 146, e.g., logged user data corresponding to a specific location L, environment E, or activity, or logged user behavior related to past connections, total connection time to a respective wireless audio data stream, proximity to each source device, and/or sensor data obtained from sensor 120. In another example, determined order 144 may be a predetermined order based on prior user data and prior behavior data 146, e.g., a predetermined order within a known environment, i.e., a favorites list, where the user has predetermined the order of known wireless audio data streams that are routinely available at a particular location L, environment E, or available while performing a known activity (e.g., running, bicycling, sitting, standing, etc.). For example, if a user goes to a particular sports bar often and routinely connects to a particular source device, e.g., a particular television, the determined order may provide that television as the first source device for an easy shortcut or quick selection by the user the next time the user enters that particular location L. In a further example, the plurality of wireless audio data streams 142A-142C can utilize one or more advertising channels within the protocol spectrum to send advertising packets within environment E. The data included in these advertising packets may include a device Media Access Control (MAC) address or physical address that is indicative of a device type or a device class of each of the source devices of the plurality of source devices 104. Based on the data included in each advertising packet, audio device 102 can use the device classes or device types of each source device to produce the determined order 144 discussed above. It should also be appreciated that the examples above related to determined order 144 can be layered. For example, the determined order can include a determination of device type or device class from the advertising packets in each wireless audio data stream of the plurality of wireless audio data streams 142A-142C, and then of the devices in a particular device class, e.g., televisions, determined order 144 can organize the plurality of wireless audio data streams based on RSSI levels of the televisions within environment E. It should be appreciated that any conceivable combination or layering of these methods of generating determined order 144 may be utilized.

During broadcast discovery mode 128, and after each wireless audio data stream of plurality of wireless audio data streams 142A-142C have been discovered and organized into determined order 144, user U can provide user input 124 via at least one sensor 120 to switch between or otherwise cycle through each discovered wireless audio data stream of plurality of wireless audio data streams 142A-142C, where the switching or cycling through utilizes determined order 144. Each wireless audio data stream of plurality of wireless audio data streams 142A-142C is utilized by acoustic transducer 116 within first circuitry 106 of audio device 102 to generate a respective sound of plurality of sounds 118A-118C, where each respective sound corresponds with each respective wireless audio data stream. For example, first sound 118A is an audible acoustic energy generated by acoustic transducer 116 which corresponds with first audio signal 117A derived from first wireless audio data stream 142A; second sound 118B is an audible acoustic energy generated by acoustic transducer 116 which corresponds with second audio signal 117B derived from second wireless audio data stream 142B; and, third sound 118C is an audible acoustic energy generated by acoustic transducer 116 which corresponds with third audio signal 117C derived from third wireless audio data stream 142C.

Upon entering broadcast discovery mode 128, first circuitry 106 can be configured to automatically generate first sound 118A corresponding to first wireless audio data stream 142A of determined order 144. It should be appreciated that first circuitry 106 can alternatively be configured to await user input prior to generating first sound 118A, i.e., user input 124. Subsequently, user U can utilize sensor 120 to generate additional user inputs 124, where each user input 124 operates to switch between or otherwise cycle through the plurality of wireless audio data streams 142A-142C, and thus switch between or otherwise cycle though each sound of plurality of sounds 118A-118C, respectively.

In one example, prior to generation of each sound of plurality of sounds 118A-118C which correspond to respective wireless audio data streams of plurality of wireless audio data streams 142A-142C, first circuitry 106 of audio device 102 is configured to generate an audio feedback 148 to provide the user with an auditory indication of the particular wireless audio data stream that will be used by acoustic transducer 116 to generate each respective audio signal 117A-117C and each respective sound of plurality of sounds 118A-118C. Audio feedback 148 is intended to be and discrete audible sound, e.g., a single tone or multiple tones such as a beep or series of beeps, or can include a digitally rendered speech and/or voice output, or a pre-recorded speech and/or voice output that is indicative of the identity of or content contained within each respective wireless audio data stream. It should be appreciated that the digitally rendered speech and/or voice output as well as the pre-recorded speech and/or voice output can be generated by a Virtual Private Assistant (VPA) and/or text-to-speech software. It should also be appreciated that the data utilized by first circuitry 106 to obtain determined order 144 may also provide the data needed to generate audio feedback 148. For example, each wireless audio data stream of plurality of wireless audio data streams 142A-142C includes data corresponding to a sound or a text-based phrase which can be utilized during the generation of audio feedback 148. In one example, illustrated in FIG. 1, audio device 102 may organize three wireless audio data streams, e.g., 142A-142C, according to determined order 144. Prior to generating first sound 118A corresponding to first wireless audio data stream 142A, acoustic transducer 116 may generate audio feedback 148 in the form of a text-to-speech generated pre-recorded speech and/or voice output to verbally recite the identity of, or the content contained within, first wireless audio data stream 142A. For example, the first wireless audio data stream 142A can be associated with the audio stream of a particular show or program being displayed on source device 104A if, for example, source device 104A is a television. Furthermore, the user U can provide an additional user input, i.e., user input 124, which indicates to first circuitry 106 that the user U would like to switch or cycle to the second wireless audio data stream 142A. After receiving the additional user input, and prior to generation of second sound 118B, first circuitry 106 is configured to generate audio feedback 148 in the form of a text-to speech generated pre-recorded speech and/or voice output to verbally recite the identity of, or the content contained within, second wireless audio data stream 142B. It should also be appreciated that rather than provide audio feedback 148 prior to generation of plurality of sounds 118A-118C, audio feedback 148 can be provided simultaneously with each sound of plurality of sounds 118A-118C, e.g., overlaid such that both first sound 118A and audio playback 148 can be heard simultaneously. It should also be appreciated that if the sounds and audio playback 148 are provided simultaneously, audio system 100 could decrease the volume of first sound 118A and/or increase the volume of audio playback 148 so that audio playback 148 is more readily distinguishable by the user.

In one exemplary operation of audio system 100, audio device 102 is configured to receive an indication 130, and upon receipt of indication 130 is configured to switch between default mode 126 and a broadcast discovery mode 128. During broadcast discovery mode 128, first antenna 114 and first circuitry 106 are configured to discover a plurality of wireless audio data streams 142A-142C within an environment E or location L, e.g., a sports bar, as illustrated in FIG. 1. In this example, the plurality of wireless audio data streams 142A-14C are broadcasted by a plurality of source devices 104A-104C, contemporaneously, where each wireless audio data stream is broadcast via a broadcast isochronous stream of a Bluetooth Low-Energy (BLE) protocol. In other words, each wireless audio data stream is broadcast using broadcast isochronous streams simultaneously, i.e., during the same time interval. First circuitry 106 is configured to organize plurality of wireless audio data streams 142A-142C in a determined order 144. Audio device 102 can be configured to automatically begin generation of a first sound 118A using acoustic transducer 116, where first sound 118A is associated with a first wireless audio data stream 142A based on determined order 144. Alternatively, first circuitry 106 is configured to wait for a user input, e.g., user input 124, prior to generation of first sound 118A. Prior to generation of first sound 118A, audio device 102 is configured to provide an audio feedback 148 in the form of a pre-recorded speech or voice output associated with first wireless audio data stream 142A. In one example, audio feedback 148 can provide a speech output indicating that first wireless audio data stream 142A is associated with a particular show or program currently playing on first source device 104A of plurality of source devices 104A-104C. In this example, first source device 104A is a television and audio feedback 148 includes a voice output which recites "Columbia Broadcasting System, 60 Minutes" to indicate to user U that the first wireless audio stream 142A is associated with a source device broadcasting the program 60 Minutes®, on the CBS network. Subsequently to providing audio feedback 148 associated with first wireless audio data stream 142A, user U can provide an additional user input, i.e., user input 124, to indicate to audio device 102 to switch or cycle to second wireless audio data stream 142B being broadcast from second source device 104B. Prior to generation of second sound 118B associated with second wireless audio data stream 142B, audio device 102 is configured to provide an audio feedback 148 in the form of a pre-recorded speech or voice output associated with second wireless audio data stream 142B. In this example, audio feedback 148 can provide a speech output indicating that second wireless audio data stream 142B is associated with a particular show or program currently playing on second source device 104B of plurality of source devices 104A-104C. In this example, second source device 104B is a television and audio feedback 148 includes a voice output which recites "Fox Sports Network, New England Patriots vs. New York Jets" to indicate to user U that the second wireless audio stream 142B is associated with a source device broadcasting an American football game between the New England Patriots and the New York Jets on the Fox Sports Network. The user can continue to cycle through each available wireless audio data stream using subsequent user inputs, i.e., user input 124, until they are content with the choice of wireless audio stream. The user U can continue to stay in broadcast discovery mode 128 and listen to the desired wireless audio stream of the plurality of wireless audio streams 142A-142C, or can provide a further user input to indicate that the user U would like to continue to listen to the selected wireless audio stream outside of broadcast discovery mode 128. Alternatively, the user U can provide a further indication or user input indicating that the user would like to exit broadcast discovery mode 128 and return to a default mode 126.

Figure 5:
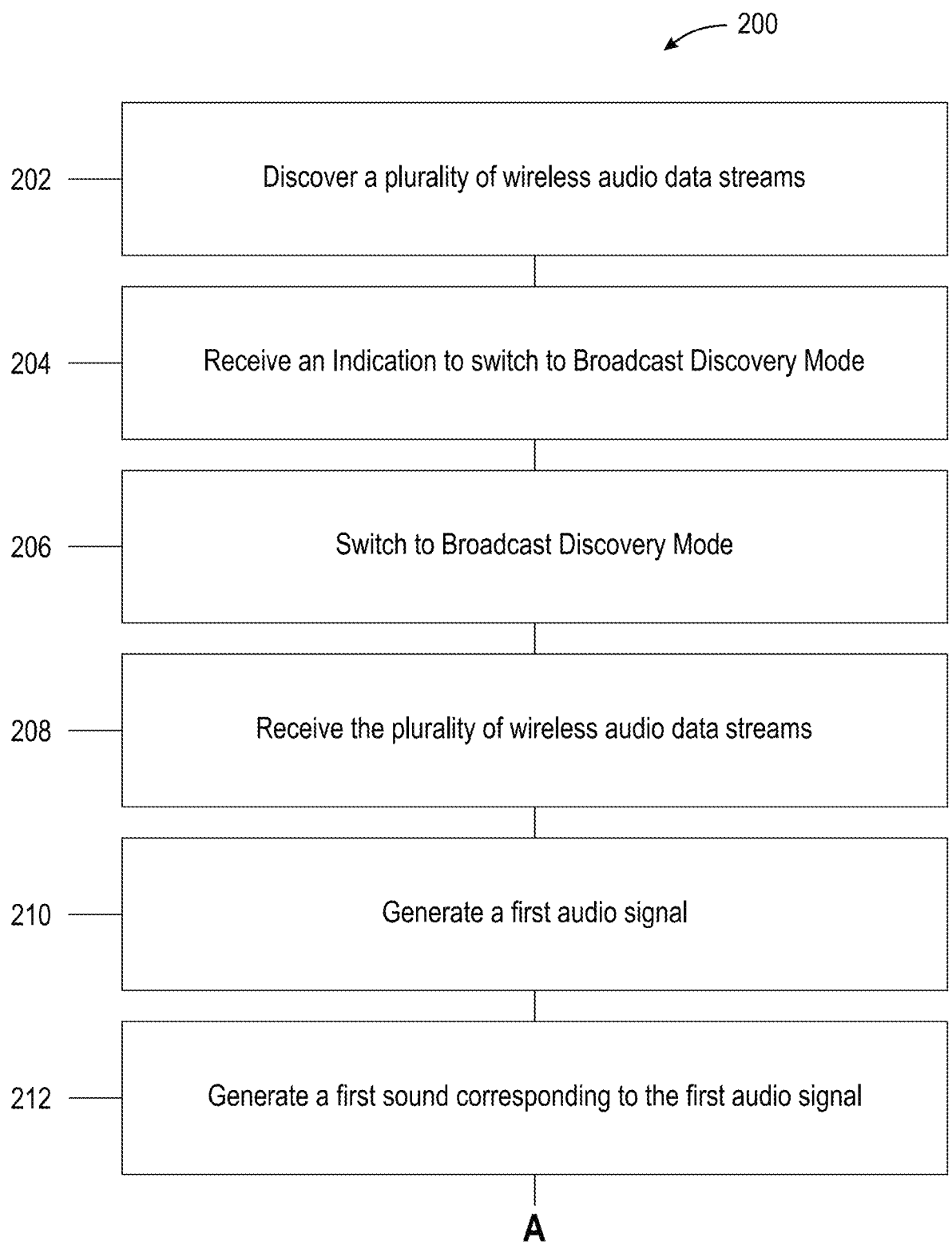
FIG. 5 is a flow chart illustrating part of a method according to the present disclosure.
Figure 6:
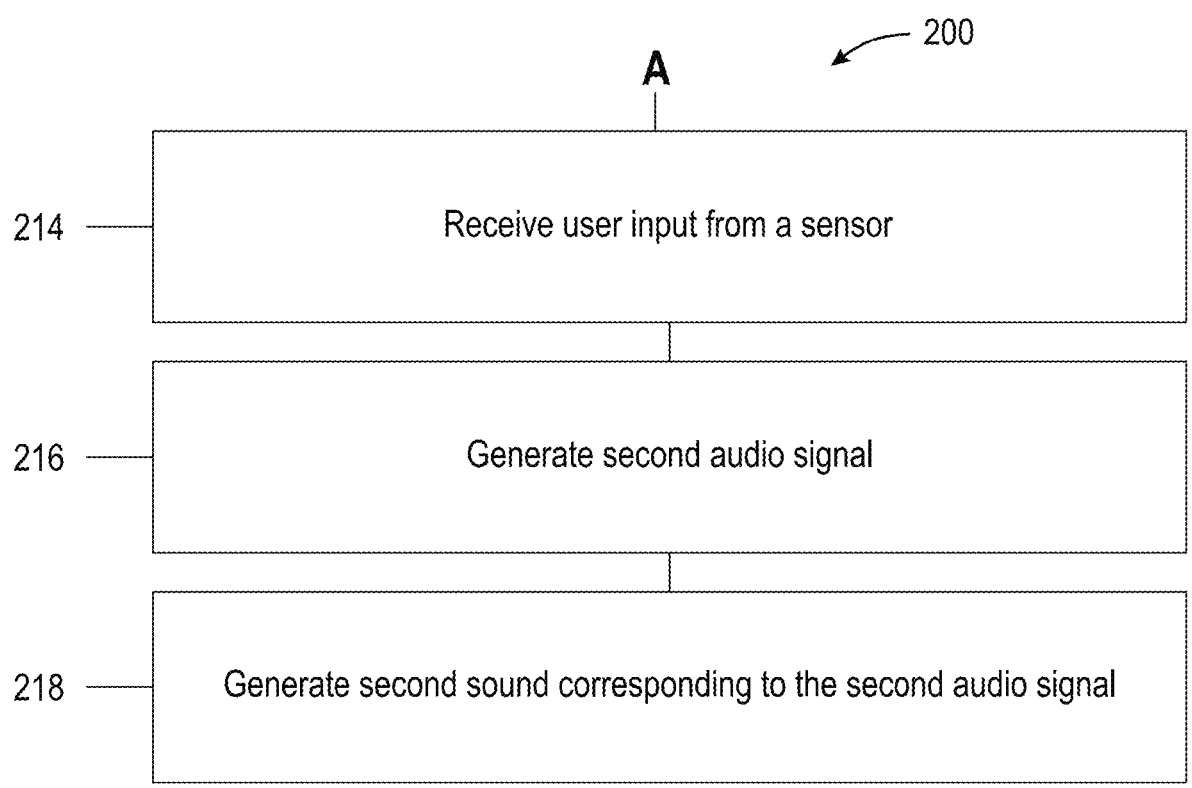
FIG. 6 is a flow chart illustrating part of a method according to the present disclosure.

FIGS. 5 and 6 illustrate a method 200 according to the present disclosure. In one example, method 200 includes: discovering, via an antenna 114 of an audio device 102, a plurality of wireless audio data streams 142A-142C using a digital packet-based wireless data protocol (202); receiving an indication 130 via circuitry 106 of the audio device 102 (204); switching, via the circuitry 106, to a broadcast discovery mode 128 upon receiving the indication 130 (206); receiving, via the circuitry 106, the plurality of wireless audio data streams 142A-142C from the antenna 114 (208); generating, via the circuitry 106, a first audio signal 117A corresponding to a first wireless audio data stream 142A of the plurality of wireless audio data streams 142A-142C (210); generating, via an acoustic transducer 116 electrically connected to the circuitry, a first sound 118A using the first audio signal 117A (212); receiving user input from 124 a sensor 120 connected to the circuitry 106 (214); generating a second audio signal 117B corresponding to a second wireless audio data stream 142B of the plurality of wireless audio data streams 142A-142C, via the circuitry 106, upon receiving the user input 124 from the sensor 120 (216); and generating, via the acoustic transducer 116, a second sound 118B using the second audio signal 117B (218).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An audio device comprising:
circuitry configured to receive a first Bluetooth (BT) Low Energy (LE) Audio broadcast stream of a plurality of BT LE Audio broadcast streams, wherein the plurality of BT LE Audio broadcast streams utilize a packet-based wireless data protocol; and
an acoustic transducer electrically connected to the circuitry, the acoustic transducer configured to render a first sound using the first BT LE Audio broadcast stream;
wherein, in response to receiving user input at the audio device, the circuitry is configured to switch to receiving a second BT LE Audio broadcast stream of the plurality of BT LE Audio broadcast streams, the second BT LE Audio broadcast stream different from the first BT LE Audio broadcast stream, and in response to receiving the second BT LE Audio broadcast stream, the acoustic transducer renders a second sound using the second BT LE Audio broadcast stream.

2. The audio device of claim 1, wherein each of the plurality of BT LE Audio broadcast streams utilize the Low Complexity Communications Codec (LC3).

3. The audio device of claim 1, wherein each of the plurality of BT LE Audio broadcast streams is a Broadcast Isochronous Stream.

4. The audio device of claim 1, wherein the circuitry is configured to receive the first BT LE Audio broadcast stream after entering a discovery mode using an indication, the indication being at least one of i) a confirmation that the audio device is in a location or ii) an initial user input received before the receiving of the user input.

5. The audio device of claim 1, wherein the user input is provided by at least one of a button, a touch-capacitive sensor, a proximity sensor, a near-field communication (NFC) unit, a gyroscope, an accelerometer, a camera, or a microphone.

6. The audio device of claim 1, wherein the first BT LE Audio broadcast stream is received from a first source device and the second BT LE Audio broadcast stream is received from a second source device different from the first source device.

7. The audio device of claim 1, wherein the circuitry is configured to switch to the second BT LE Audio broadcast stream based on an order of cycling through the plurality of BT LE Audio broadcast streams.

8. The audio device of claim 7, wherein the order of cycling through the plurality of BT LE Audio broadcast streams is based at least in part on a Received Signal Strength Indicator (RSSI) associated with each of the plurality of BT LE Audio broadcast streams.

9. The audio device of claim 1, wherein the audio device is a wearable audio device.

10. The audio device of claim 1, wherein, prior to the acoustic transducer rendering the second sound using the second BT LE Audio broadcast stream, the acoustic transducer renders audio feedback to indicate that the second BT LE Audio broadcast stream is active.

11. A method of selecting a Bluetooth (BT) Low Energy (LE) Audio broadcast stream using an audio device, the method comprising:
- receiving, via circuitry of the audio device, a first BT LE Audio broadcast stream of a plurality of BT LE Audio broadcast streams;
- rendering, via an acoustic transducer electrically connected to the circuitry, a first sound using the first BT LE Audio broadcast stream;
- in response to receiving user input at the audio device, switching to receiving a second BT LE Audio broadcast stream of the plurality of BT LE Audio broadcast streams, the second BT LE Audio broadcast stream different from the first BT LE Audio broadcast stream; and
- in response to receiving the second BT LE Audio broadcast stream, rendering, via the acoustic transducer, a second sound using the second BT LE Audio broadcast stream.

12. The method of claim 11, wherein each of the plurality of BT LE Audio broadcast streams utilize the Low Complexity Communications Codec (LC3).

13. The method of claim 11, wherein each of the plurality of BT LE Audio broadcast streams is a Broadcast Isochronous Stream.

14. The method of claim 11, wherein the circuitry is configured to receive the first BT LE Audio broadcast stream after entering a discovery mode using an indication, the indication being at least one of i) a confirmation that the audio device is in a location or ii) an initial user input received before the receiving of the user input.

15. The method of claim 11, wherein the is provided by at least one of a button, a touch-capacitive sensor, a proximity sensor, a near-field communication (NFC) unit, a gyroscope, an accelerometer, a camera, or a microphone.

16. The method of claim 11, wherein the first BT LE Audio broadcast stream is received from a first source device and the second BT LE Audio broadcast stream is received from a second source device different from the first source device.

17. The method of claim 11, wherein the second BT LE Audio broadcast stream was selected based on an order of cycling through the plurality of BT LE Audio broadcast streams.

18. The method of claim 17, wherein the order of cycling through the plurality of BT LE Audio broadcast streams is based at least in part on a Received Signal Strength Indicator (RSSI) associated with each of the plurality of BT LE Audio broadcast streams.

19. The method of claim 11, wherein the audio device is a wearable audio device.

20. The method of claim 11, wherein, prior to the acoustic transducer rendering the second sound using the second BT LE Audio broadcast stream, the acoustic transducer renders audio feedback to indicate that the second BT LE Audio broadcast stream is active.

* * * * *